(12) United States Patent
Simon et al.

(10) Patent No.: US 9,528,647 B2
(45) Date of Patent: Dec. 27, 2016

(54) FLUID COUPLING WITH SAFETY LOCK

(75) Inventors: Horst Simon, Gummersbach (DE); Stefan Witt, Eberdingen (DE)

(73) Assignee: Rectus GMBH, Eberdingen-Nussdorf (DE)

( * ) Notice: Subject to any disclaimer, the term of this patent is extended or adjusted under 35 U.S.C. 154(b) by 1946 days.

(21) Appl. No.: 12/411,517

(22) Filed: Mar. 26, 2009

(65) Prior Publication Data

US 2009/0243286 A1    Oct. 1, 2009

(30) Foreign Application Priority Data

Mar. 28, 2008   (DE) .................. 10 2008 016 029

(51) Int. Cl.
*F16L 37/23* (2006.01)

(52) U.S. Cl.
CPC ...................... *F16L 37/23* (2013.01)

(58) Field of Classification Search
USPC ........ 285/33, 34, 83, 86, 305, 306, 314, 315
See application file for complete search history.

(56) References Cited

U.S. PATENT DOCUMENTS

| | | | | |
|---|---|---|---|---|
| 915,985 | A | * | 3/1909 | Medovarski .................... 285/86 |
| 2,270,089 | A | * | 1/1942 | Stout ................................ 285/5 |
| 2,591,531 | A | * | 4/1952 | Fishback ......................... 285/5 |
| 3,291,152 | A | * | 12/1966 | Comer ..................... 137/614.04 |
| 3,383,123 | A | * | 5/1968 | Murray ........................... 285/83 |

FOREIGN PATENT DOCUMENTS

| | | |
|---|---|---|
| DE | 10 2005 025 548 A1 | 12/2006 |
| EP | 1729051 B1 | 10/2008 |

\* cited by examiner

*Primary Examiner* — David E Sosnowski
*Assistant Examiner* — James Linford
(74) *Attorney, Agent, or Firm* — John A. Molnar, Jr.

(57) ABSTRACT

A coupling for connection to a source of fluid pressure such as in a breathing-protection. The coupling has a socket end and a plug end insertable into the socket end. The socket end has a body and a locking sleeve on the body. As the plug end is inserted into the socket end, the locking sleeve is moved axial from a first axial position to a second axial position locking the plug end within the socket end, and rotationally from a release position to a locked position delimiting the movement of the locking sleeve from the second axial position to the first axial position. When the coupling is pressurized, a piston within the body is moved from a retracted position to an extended position delimiting the rotational movement of the locking sleeve from the locked position to the release position.

10 Claims, 6 Drawing Sheets

US 9,528,647 B2

FLUID COUPLING WITH SAFETY LOCK

CROSS-REFERENCE TO RELATED CASES

The present application claims the benefit of the filing date of German Patent Application No. 10 2008 016 029.6, filed Mar. 28, 2008, the disclosure of which is expressly incorporated herein by reference.

BACKGROUND OF THE INVENTION

The invention concerns a plug coupling for directing a fluid under pressure, especially for breathing-protection devices, with a box-shaped receiving part and a plug part within it, into which a plug can be inserted, whereby the receiving part has a valve housing with locking means mounted inside it to lock the plug part into the plugged-in position in the receiving part and a locking sleeve cooperating with the locking means, arranged to be movable back and forth between two axial positions and also rotatable in such a way that the locking sleeve, which is spring-prestressed in the axial direction, fixes the locking and in the other axial position releases a movement of the locking means as a release position for the plug part in the locked position in the sense of removing the plug part from the receiving part, and that the locking sleeve, also spring-prestressed in the direction of rotation and can be rotated between a first rotational position and a second rotational position on the valve housing, is locked with the valve housing in its first rotational position and in its second rotational position, it permits an axial movement of the locking sleeve in the released position, and whereby an additional security device is provided, applied with the plug part plugged into the plug coupling, against a rotation of the locking sleeve with increasing pressure of the fluid led through it.

A plug coupling with the above-mentioned characteristics is known from DE 102005025548 A1, now EP 1 729 051 B1. The plug coupling described therein consists, in its parts most essential for understanding the described invention, of a base body as the receiving part and a plug part. On the base body, a locking sleeve is arranged so as to move between two axial positions, which in the first axial position establishes locking means for locking the plug part in the receiving part and in the second axial position releases the locking device in terms of removing the plug part from the receiving part. In order to make an unintentional detachment of the plug part more difficult, the locking sleeve is also arranged in such a way that it can rotate between two rotational positions so that movement of the locking sleeve from the one axial position, in which the locking means are locked, is blocked until the locking sleeve is changed from a first rotational position to a second rotational position. A fluid chamber between the base body accepting the receiving part and the locking sleeve acts as a further security measure against a detachment of the plug coupling with the plug coupling under pressure. This fluid chamber communicates with the fluid led through the plug coupling and serves to generate a force corresponding to the prevailing pressure hold to hold the locking sleeve in the locking position. The force generated is greater than the force that a user can apply by hand if he tries to move the locking sleeve into the unlocked position.

The known plug coupling is associated, first of all, with the disadvantage that the arrangement of the fluid chamber in the receiving part and its connection to the locking sleeve causes a complicated structure of the plug coupling with corresponding individual parts, which is according expensive in production and assembly. Furthermore, it is a disadvantage that securing the locking sleeve is aimed at making it more difficult to move the locking sleeve when the plug coupling is under pressure and it is therefore based on a force closing, so that, for example, at a lower pressure in the plug coupling, no adequate security against detachment of the plug coupling can be given.

The invention is therefore based on the task of improving the security of the plug coupling with the characteristics mentioned in the introduction against unlocking when the plug coupling is under pressure and at the same time simplifying the plug coupling in its structure.

BROAD STATEMENT OF THE INVENTION

In its basic idea, the invention envisions that the security device consists of at least one piston arranged in a hole running radially in and connected to the pressure-directing channel of the plug coupling, which, when the plug coupling is closed by the applied pressure, the piston moved into a position that projects beyond the outer perimeter of the valve housing and prevents a rotary movement of the locking sleeve.

The invention is connected with the advantage that by means of the piston arranged with pressure applied in the valve housing, the locking sleeve is already positively locked in its first rotational position, which forms the locking position for the plug part, so that when the plug coupling is under pressure the locking sleeve can already not be moved to its second rotational position, in which, a movement of the locking sleeve into its release position for the locking means is at all possible in general. This implies that the pressure control for the piston is essentially simpler to handle that the control in the state of the art for the force to be generated for the force closing. With this simpler control, the structure of the plug coupling becomes simpler, with fewer individual parts.

According to one embodiment example, an additional security measure is envisioned, with which detachment of the plug coupling is prevented when the locking sleeve has not completely entered the locking groove in the receiving part. In this case, intermediate positions of the locking means are conceivable, in which the locking sleeve still lies with one part over the piston so that when the piston is under pressure, it cannot be moved out. If the locking sleeve is then rotated back from such an intermediate position to its position permitting movement, unlocking of the plug coupling under pressure is then possible. In order to exclude such a possibility, the invention foresees that the locking sleeve is provided, on its surface facing the piston, with an indentation for positive-locking entrance of the piston into the locking sleeve and for fixing the locking sleeve in both its axial and rotary positions. Thus, if the locking sleeve is rotated in the direction of the rotational position permitting the release position, then the piston under pressure automatically locks the locking sleeve in the indentation and thus prevents it from possibly being moved in spite of the locking sleeve being in the moving position.

According to a first embodiment of the invention, it is envisioned that the locking sleeve has a cam springing radially inward that can be moved in the second rotational position, which makes axial movement possible, along a flattening formed on the valve housing, and in the first rotational position, locked with the valve housing, enters the adjacent locking groove of the valve housing on, whereby the hole formed in the valve housing is equipped in such a way that the piston stands out in its pushed-out position above the flattening of the locking housing and thus prevents the locking sleeve from being rotated from the first rotational position to the second rotational position. In this embodiment, the piston projecting out from the flattening of the valve housing formed for the security sleeve is prevents the locking sleeve from rotating into its rotational position in which, after the cam comes free from the locking groove of the valve housing, the cam is equipped with the flattening of the valve housing, and it be moved along the flattening.

In this case, it can be envisioned that the piston is pre-stressed by means of a pressure spring arranged in the hole in its position inside the valve housing. by interpreting the force of the pressure spring, the response pressure at which pressure of the fluid being led through remaining in the plug coupling can thus be set, overcoming the spring force of the pressure spring and moving the piston into the hole in its pushed-out position, where the piston fixes the locking sleeve. If the plug coupling is set to detach without pressure the pressure spring thus moves the piston back into its position lying within the valve housing, in which the locking sleeve can be rotated.

To seal the hole, it is envisioned, according to one embodiment example, that at the radially outward end of the hole, a tight sleeve is placed to seal the hole and for sealed guiding of the piston, against which the pressure spring with one end lying on the piston is supported.

To implement the additional security in this embodiment of the invention, it can be envisioned that an indentation to receive the piston in its pushed-out position is formed in the bottom of the cam facing the valve housing.

According to an alternative embodiment of the invention, it is envisioned that the locking sleeve have a cam springing radially inward that, in the second rotational position of the locking sleeve, which makes axial movement possible, can be moved along a flattening formed on the valve housing and in the first position rotational position, locked with the valve housing, enters a locking groove adjacent to the valve housing in the circumferential direction, whereby the hole formed in the valve housing is arranged outside the flattening and in the circumferential segment holding the piston in its second rotational position, permitting the piston to be held in its pushed-in position inside the locking sleeve and an adjacent indentation to received the piston in its pushed-out position are arranged. In this embodiment, arranging a spring applied to the piston can be omitted, since the movement of the piston is controlled, on the one hand, by the effective pressure and, on the other hand, by the formations on the inside of the locking sleeved. To this extent, in this embodiment example, very low pressures are already sufficient to move the piston into its pushed-out position. On the other hand, the piston is pushed back to its pushed-in position in the hole by the rotation of the locking sleeve.

In view of a control of the piston movement related to this, according to one embodiment example of the invention, it is envisioned that the transition between the circumferential segment holding the piston in the pushed-in position and indentation is formed as a striking edge for the piston acting in the direction of rotation, with a radius pressing the piston into the hole.

In this embodiment example of the invention, too, it is envisioned that in the circumferential segment holding the piston in its pushed-in position, and indentation is made to received the piston in its pushed-out position, so that with this measure, it is again ensured that when the locking sleeve is not set back sufficiently, and the rotation sleeve into the pushing position, the piston under pressure is in the assigned indentation and the locking sleeve is thereby positively locked, although the locking sleeve, after the cam is provided and the valve housing is flattened, is in a rotational position in which movement of the locking sleeve is possible, in principle.

In order to be able to unlock this locking after such a locking has occurred, it can be envisioned that the edged delimiting the indentation in the circumferential direction are formed with a radius that presses the piston into the hole. In this example embodiment of the invention, it can be envisioned that the piston is sealed against the hole by means of seal arranged on its circumference.

It can be envisioned that cams and assigned flattenings in a symmetric arrangement on sides of the valve housing and the locking sleeve lying opposite each other, and correspondingly two holes with pistons and assigned circumferential segments and indentations are arranged.

BRIEF DESCRIPTION OF THE DRAWINGS

For a fuller understanding of the nature and objects of the invention, reference should be had to the following detailed description taken in connection with the accompanying drawings wherein:

FIG. 3 shows the object of FIG. 1 with the plug part coupled in;

The drawings will be described further in connection with the following Detailed Description of the Invention.

DETAILED DESCRIPTION OF THE INVENTION

Figure 1:
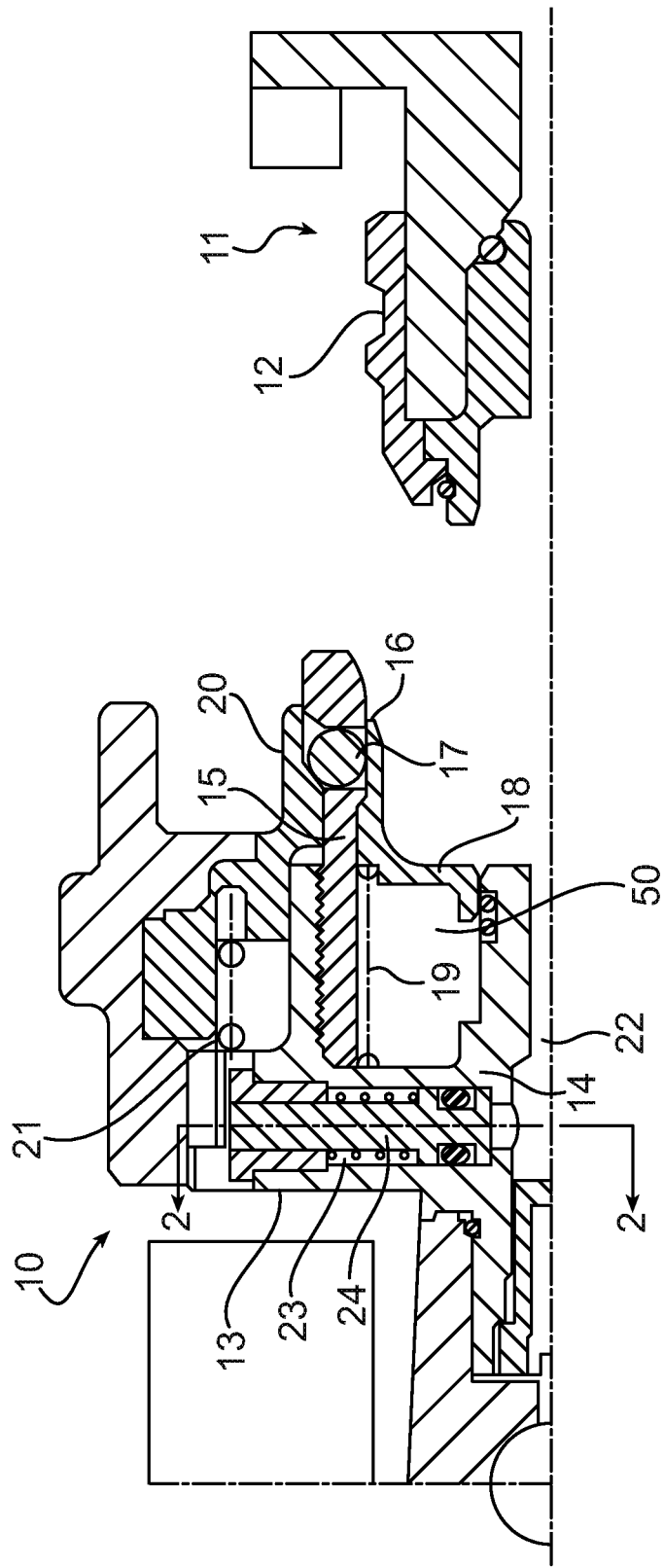
FIG. 1 shows a plug coupling in a schematic section side view in an uncoupled state, with the plug part not coupled and a locking sleeved in the release position.

As results from FIG. 1, first of all, the plug coupling consists of a receiving part 10 and a plug part 11 that can be plugged into it. To the extent that the structure of the plug part 11 is not involved for understanding of the present invention, it is only emphasized that a locking groove 12 is formed in the receiving part 10 for the locking of the plug part 11 in the receiving part 10, to be described later.

The receiving part 10 consists of a valve housing 13 with a base body 14 and a base-body sleeve 15 screwed to it, in the front region of which indentations 16 are formed, into which locking balls 17 are inserted. The base body 14 and the base-body sleeve 15 form together a receiving space 50 for the plug part 11, in which receiving space 50 an inner control sleeve 18 is arranged. The control sleeve in this case holds the locking balls 17 away from the plug path for the plug part 11.

Figure 3:
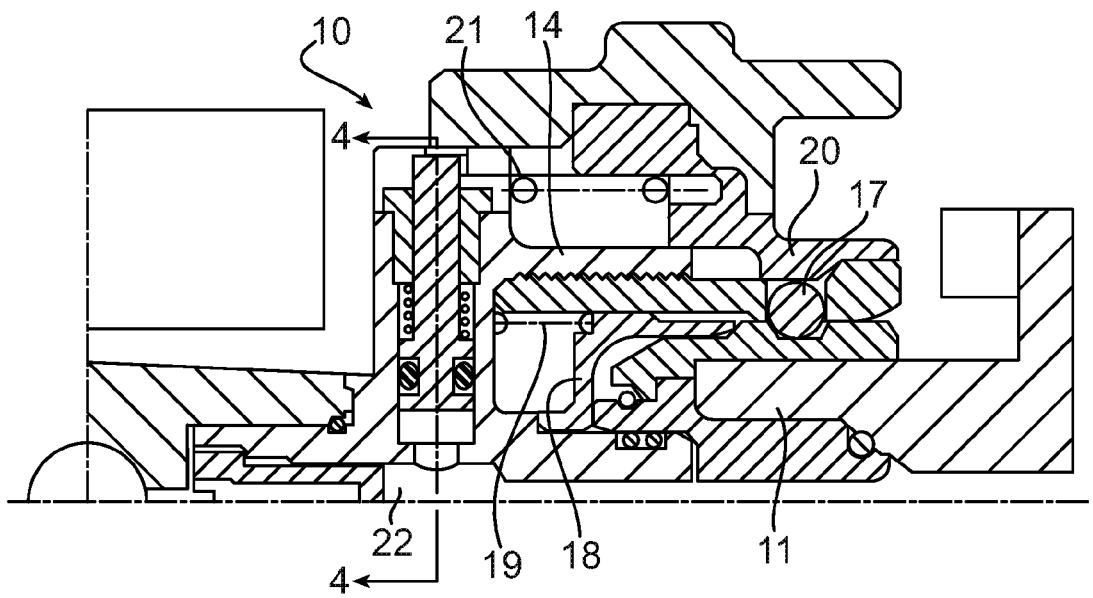
Figure 4:
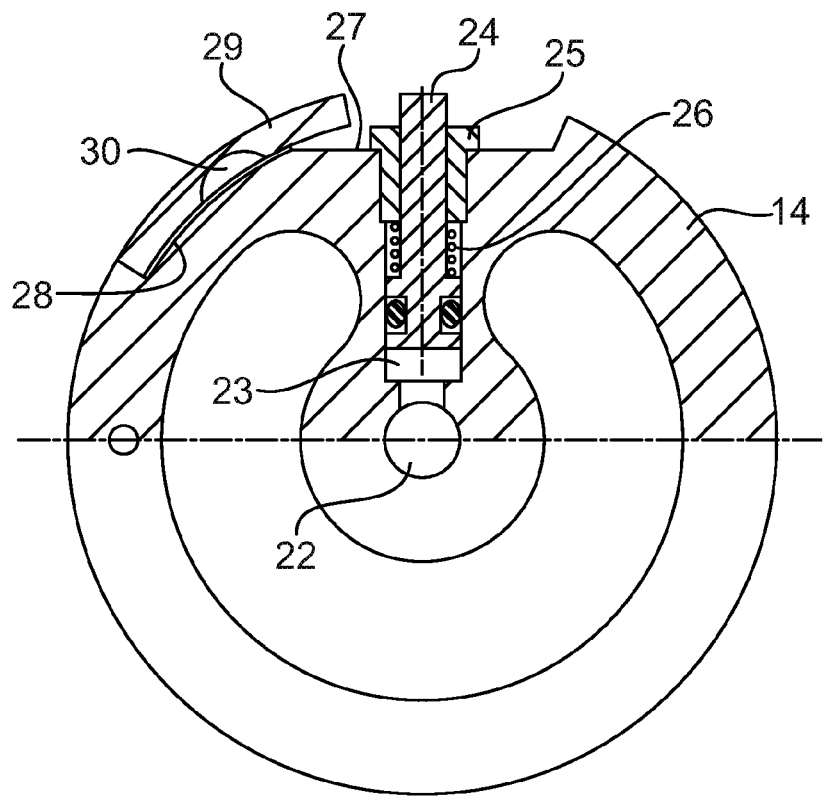
FIG. 4 shows a cross-section view corresponding to FIG. 3 in a representation according to FIG. 2.
Figure 5:
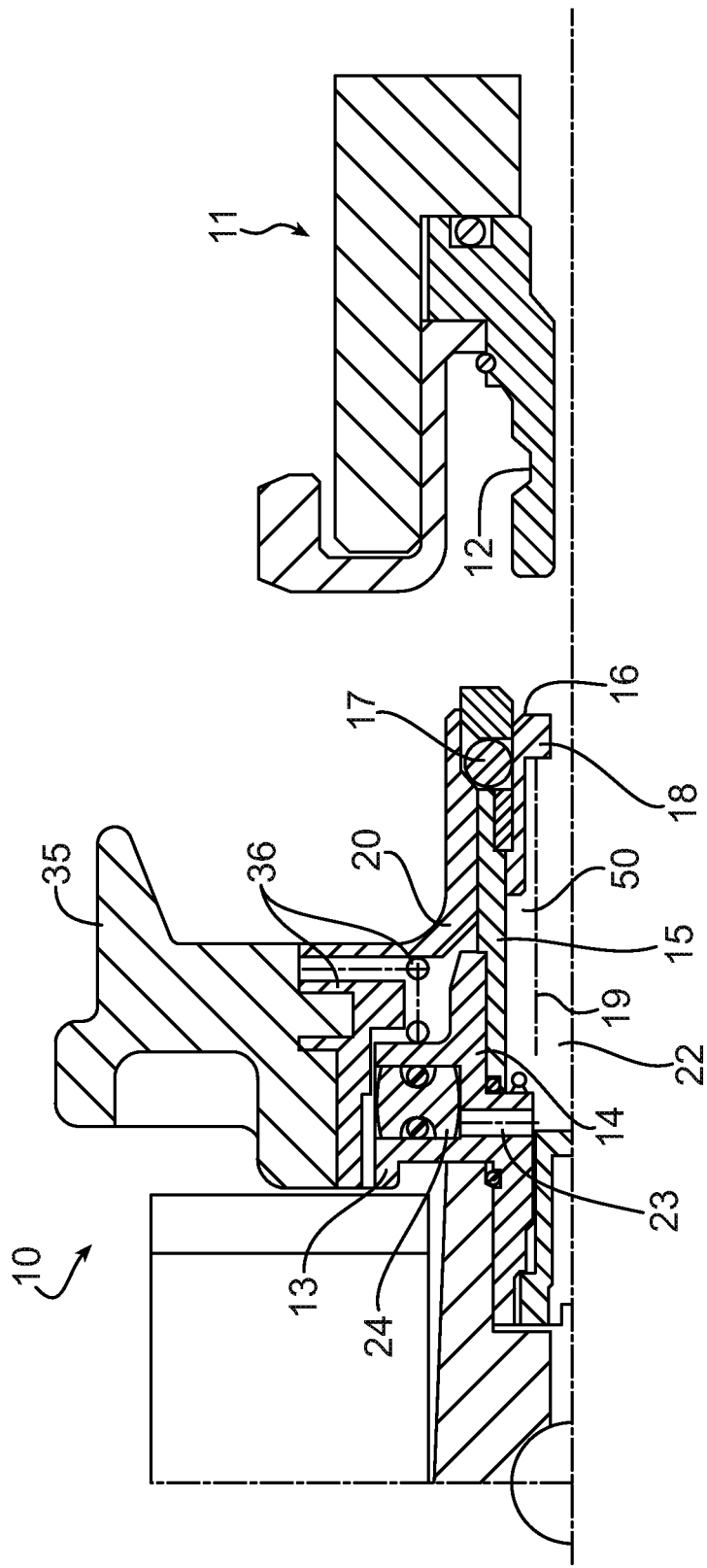
FIG. 5 shows another embodiment example of the plug coupling, in a schematic section side view in an uncoupled state and with the locking sleeve in the release position.

On the outside of the base-body sleeve 15, a locking sleeve 20 is arranged to move between a first axial position according to FIG. 1 and a second axial position according to FIG. 3, specifically against the force of a pressure spring 21. In the first axial position, which can be seen in FIG. 1, with the plug coupling uncoupled, the locking sleeve 20 has one arm over the assigned indentation 16 in the base-body sleeve 15 and strikes the locking balls 17 on the inner control sleeve 18 with a force acting in the radial direction of the locking-ball system 17. If, as results from a comparison of FIGS. 1 and 3, the plug part 11 is pushed in, striking the inner control sleeve 18 in the receiving space 50 of the valve housing 13, then the rocking balls 17 lock into the locking groove 12 of the plug part, after which the locking sleeve 20 is pushed by the action of the pressure spring 21 into its second axial position (FIG. 3), in which the locking sleeve 20 fixes and secures the locking balls 17 in the locking groove 12 of the plug part 11.

The locking sleeve 20, in the embodiment example presented, consists of several parts, which, however, are determined constructively and functionally and are not of importance for implementing the invention.

As results from viewing FIGS. 1 to 4 together, a flattening 27 is formed, which extends in the longitudinal direction of the valve housing 13 on the base body 14 of the valve housing 13, the length of which corresponds to at least the path of movement of the locking sleeve 20 between its release position (FIG. 1) and its secure position (FIG. 3). The locking sleeve 20 has a cam 29, which springs inward, which, in one rotational position of the locking sleeve 20 with the flatting 27, is oriented in such a way that the cam 29 slides over the flattening 27 and thereby makes a movement of the locking sleeve 20 possible. Furthermore, a locking groove 28 is formed in the base body 14 to receive the cam 29, into which the cam 29 locks in the coupled position of the plug coupling, as results from viewing FIGS. 3 and 4 together. The locking sleeve is thereby subject to the action of a pressure spring, which prestresses the locking sleeve 20 in the position in which the cam 29 lies in the locking groove 28. Thus, starting from the representation according to FIGS. 1 and 2, if the plug part 11 is coupled into the receiving part 10, then the locking sleeve 30 is moved due to the action of the spring 21 into the secure position according to FIG. 3, and in this position, it rotates into its second rotational position, in which the cam 29 comes free from the locking groove 28 and is oriented toward the flattening 27, so that a movement of the locking sleeve 20 along the flatting 27 is possible.

Figure 2:
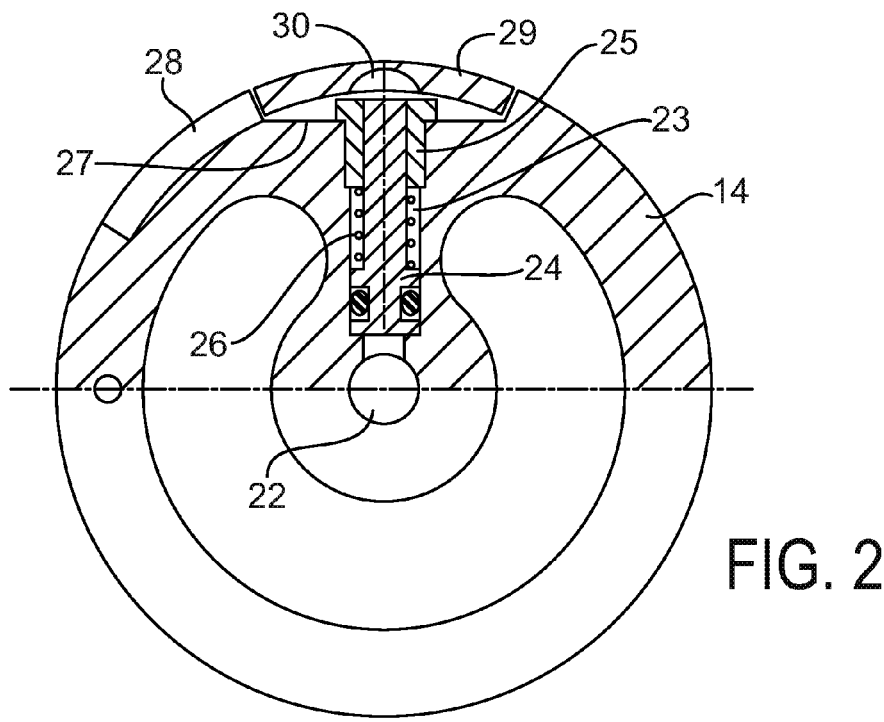
FIG. 2 shows the object of FIG. 1 in a partial cross-section view of the locking sleeve and a security device for it.

To secure the plug coupling against detachment of the plug coupling under pressure, a hole 23 running radially in the base body 14 is formed, which is arranged in such a way that, on the one hand, it is connected to the passage channel 22 of the coupled plug coupling, which is under pressure, and at its other end, it ends in the flattening 27. In the hole 28, a piston is arranged so as to movable, whereby a sealing sleeve 25 is placed at the end of the hole 23 that opens in the flattening 27 and seals the hole 23 that is under pressure when the plug coupling is coupled. the piston 24 is fed in the sealing sleeve 25 in a sealed manner, whereby the piston is supported, on the one sided, by a pressure spring 26, and on the other side on the sealing sleeve, prestressed in its pushed-in position (FIG. 2).

If the hole 23 comes under pressure with the plug coupling coupled and the fluid under pressure been fed through, then the piston 24 is pushed out against the spring 26 acting on it, so that one end projects from the flattening 27. Since in this coupled position, the locking sleeve 20 is in a rotational position in which its cam 29 lies in the locking groove 28, rotation of the locking sleeve is prevented with piston pushed 25 out under pressure. In this way, it is ensured, through the positive-locking security device, that uncoupling of the plug coupling is not possible.

Figure 2A:
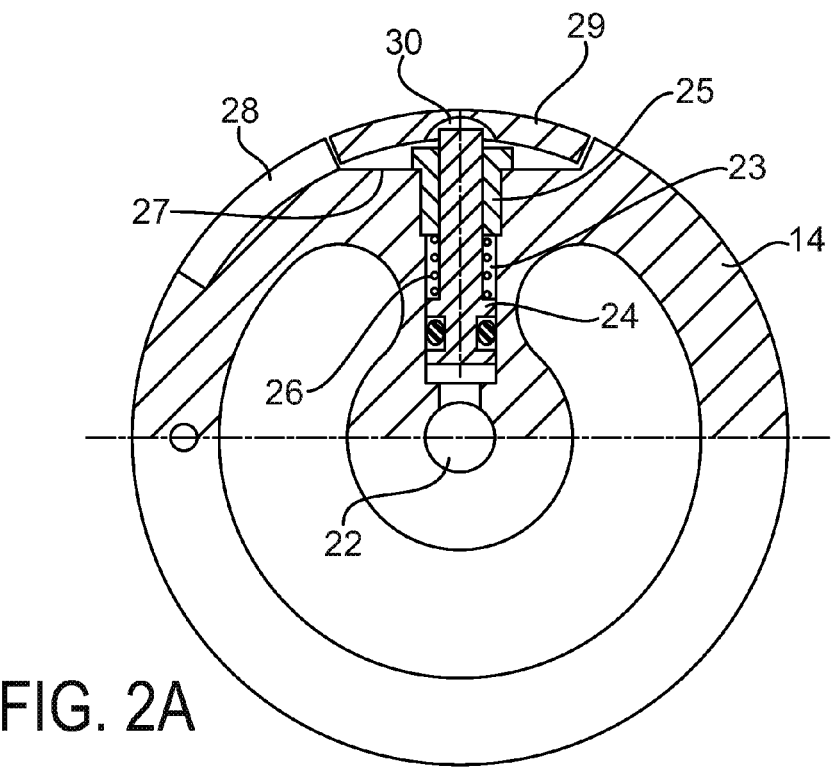
FIG. 2A shows the object of FIG. 1 in a partial cross-section as in FIG. 2, but with the security device in an extended position.

As an additional measure, the cam 29 has on its bottom, facing the base body 14, an indentation 30 to receive the piston 24 in its pushed out position. Specifically, to the extent that in the front locking position for the locking balls 17, the locking sleeve is not completely in its secure position with the cam 29 rotated in the locking groove 28, but has assumed an intermediate position, this intermediate position can be viewed in such a way that the end of the cam 29 is still over the piston, so that the piston 26 under pressure cannot come completely out from the hole 23, but only at the bottom against the cam 29. From such an intermediate position, no fixation of the locking sleeve 20 is given by the piston under pressure. As depicted in FIG. 2A, it is now ensured, by the indentation 29 envisioned on the cam 29, that when the security sleeve 20 is rotated into its release position, the piston 24 under pressure is locked into the indentation 30 of the cam 29 and thus the locking sleeve 20 is positively locked on the base body of the valve housing 13, so that movement of the locking sleeve 20 is excluded.

If, with the plug coupling is placed without pressure, it is uncoupled, then the spring 26 presses the piston 24 back into its initial position, in which rotation of the locking sleeve 20 into its rotational position that makes movement possible.

The embodiment example represented in FIGS. 5 through 8 differs from the embodiment example described above in FIGS. 1 through 4 essentially in an alternative formation of the pressure-controlled piston arrangement for fixing the locking sleeve 20. To the extent that additional constructive differences exist in the formation of the valve housing 13 and the plug part 11, these differences are not further relevant for the present invention, so they will not be discussed separately. It will only be noted that a hand wheel 35 is envisioned for activation of the locking sleeve and connected appropriately to the locking sleeve and that a unified pressure spring 36 is envisioned to be applied by the locking sleeve 20 or the hand wheel 36 with action in both axially and in rotationally.

Figure 6:
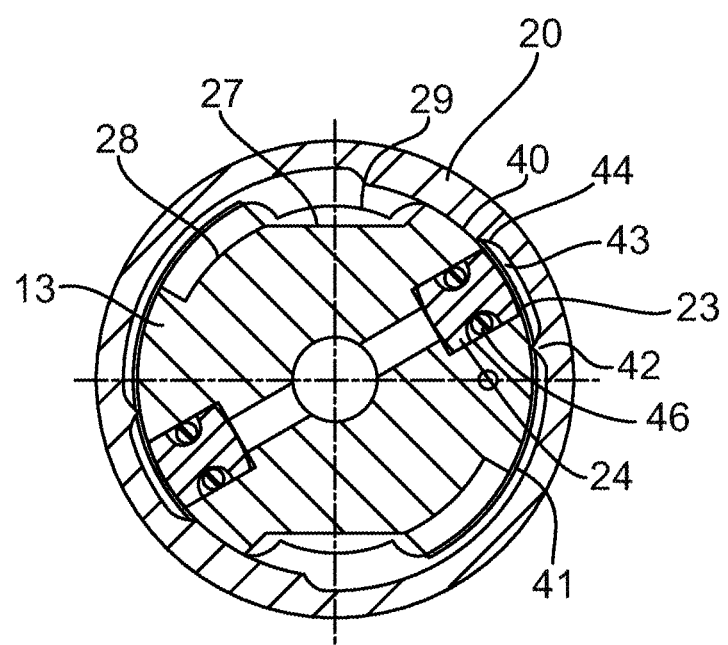
FIG. 6 shows the object FIG. 5, in a partial cross-section view of a locking sleeve and a securing device for it.
Figure 7:
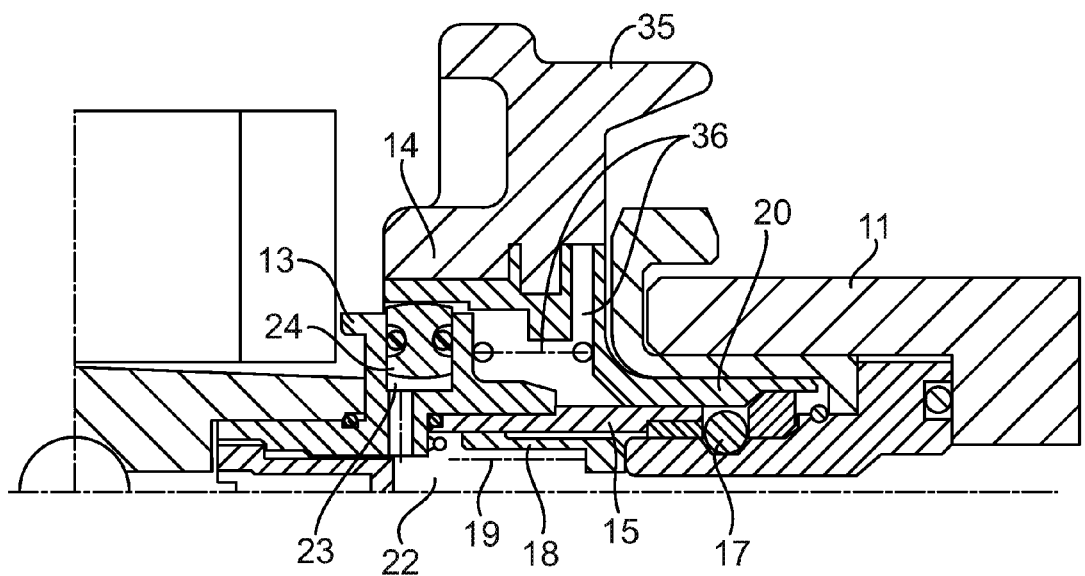
FIG. 7 shows the object of FIG. 5 in with the plug part uncoupled.
Figure 8:
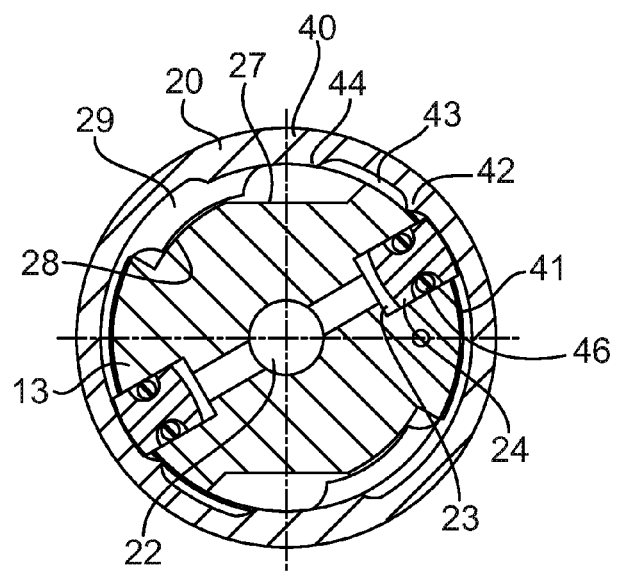
FIG. 8 shows cross-section view of the uncoupled state according to FIG. 7, in a representation corresponding to FIG. 6.

To the extent that also in this embodiment example a movable piston 24 is again envisioned as a security device for the locking sleeve 20, under pressure in a hole 23, a spring applied to the piston is omitted in this embodiment example. Rather, control of the piston between its position pushed out from the hole 23 and its pushed-in position in the base body 14 by rotation of the locking sleeve 20, which encloses the valve housing completely for this purpose. On the inside of the locking sleeve 20, a circumferential segment 40 is first formed, which holds the piston 24 in the pushed-in position in hole 23. In this position, according to FIGS. 5 and 6, the locking sleeve 20, with the cam 29 formed on it is directed to the flattening 27 of the base body 14, and can thus move between the axial positions assigned to it. On the circumferential segment 40, an indentation 41 is connected, which, on the one hand, provided sufficient free space for the piston 24 to be pushed out from the hole 23, so that in the pushed-out position, the piston 24 projects over the surface of the base body 14 of the valve housing 13. The striking edge 42 between the circumferential segment 40 and the indentation 41 thus represents a positive locking for fixation of the locking sleeve 20 in the locking position represented in FIGS. 7 and 8, in which, because of the effect of the rotational-pressure spring 36, the locking sleeve 20 is rotated into its rotational position in which the cam 29 lies in the locking groove 28 and prevents movement of the locking sleeve 20. If the piston 24 is pushed out and thus lies in the indentation 41 of the locking sleeve 20, because of the pressure applied outward in the hole 23, rotation of the locking sleeve 20 into its other rotational position according to FIG. 6 is excluded.

In this embodiment example of the invention, the movement path of the piston 24 is controlled solely by the pressure prevailing in the passage channel 22, whereby the piston 24 is sealed against the hole 23 by a seal 46 arranged on its outer circumference. Since, to the extent that the piston 24 can move slightly in the hole 23, low pressures are already sufficient to contribute to the movement of the piston 24. To the extent that a back movement of the piston 24 into the hole 23 is to occur with the plug coupling free of pressure, this takes place by a rotation of the locking sleeve 20 from the rotational position represented in FIG. 8 to the rotational position represented in FIG. 6, and for this purpose, the striking edge 42 is implemented with an appropriate radius to facilitate movement of the piston 24.

As in the embodiment example described in FIGS. 1 through 4, an indentation 43 is also envisioned in this embodiment example, in which the piston 24 under pressure is locked when the locking sleeve 20 is to be rotated into its movement position while still under the action of pressure. In order that this security position can also be released, the edges 44 delimiting the indentation 43 are formed with an appropriate radius that facilitates the piston 24 being pushed into the hole when free of pressure.

In the embodiment example represented in FIGS. 5 through 8, two holes each are envisioned in a symmetric arrangement with two pistons, and correspondingly, the locking sleeve has two cams 29 and two circumferential segments 29 and indentations 41, and the base body 14 of the valve housing 13 is also equipped with two flattening 27 and two locking nuts 28.

Otherwise, however, the plug coupling according to FIGS. 4 through 8 fulfills the same function as that described in the embodiment example according to FIGS. 1 through 4.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A coupling for connection to a source of fluid pressure, the coupling comprising:
   a receiving part comprising:
      a valve housing having a passage channel extending axially therethrough and a hole extending radially therethrough, the passage channel being connectable in fluid communication with the source of fluid pressure, and the hole connected in fluid communication with the passage channel;
      a piston received within the hole for sliding radial movement therein responsive to fluid pressure being received within the passage channel between an inward pushed-in position and an outward pushed-out position; and
      a locking sleeve received coaxially on the valve housing for movement thereon between a first axial position and a second axial position, and for rotational movement thereon between a first rotational position and a second rotational position; and
   a plug part insertable coaxially into the receiving part,
      wherein as the plug part is inserted into the receiving part, the locking sleeve is moved axially from the first axial position to the second axial position locking the plug part within the receiving part, and rotationally from the first rotational position to the second rotational position preventing the movement of the locking sleeve from the second axial position to the first axial position, and
      wherein with the coupling being connected to the source of fluid pressure and with fluid pressure being received within the passage channel, the piston is moved from the pushed-in position to the pushed-out position preventing the rotational movement of the locking sleeve from the second rotational position to the first rotational position.

2. The coupling of claim 1 wherein the piston is normally biased in its pushed-in position.

3. The coupling of claim 1 wherein the locking sleeve has an inner surface facing the piston, the surface having an indentation formed therein, and the piston being received in its pushed-out position within the indentation in the second rotational position of the locking sleeve preventing the movement of the sleeve from the second axial position to the first axial position.

4. The coupling of claim 1 wherein the valve housing is formed as having an outer surface including a flattening extending axially along the outer surface and an adjoining locking groove extending radially along the outer surface, the locking sleeve having a radially inwardly extending cam which is movable along the flattening as the locking sleeve is moved in the first rotational position from the first axial position to the second axial position, and the cam being received within the locking groove when the locking sleeve is rotated from the first rotational position to the second rotational position.

5. The coupling of claim 4 wherein the cam has an inner surface facing the piston, the surface having an indentation formed therein, and the piston being received in its pushed-out position within the indentation in the first rotational position of the locking sleeve preventing the movement of the sleeve from the second axial position to the first axial position.

6. The coupling of claim 5 wherein the rotation of the locking sleeve from the second rotational position to the first rotational position is preventing by the abutment of the cam against the piston when the piston is disposed in the pushed-out position.

7. The coupling of claim 4 wherein the locking sleeve has an inner surface facing the piston, the surface having a first indentation formed therein, and the piston being received in its pushed-out position within the first indentation in the second rotational position of the locking sleeve preventing the movement of the sleeve from the second axial position to the first axial position.

8. The coupling of claim 7 wherein the locking sleeve inner surface has a second indentation formed therein, the piston being received in its pushed-out position within the second indentation in the first rotational position of the locking sleeve preventing the movement of the sleeve from the second axial position to the first axial position.

9. The coupling of claim 8 wherein the first and the second indentation are separated by an edge formed in the locking sleeve inner surface, the piston being moveable from the pushed-out position to the pushed-in position responsive to contact with the edge as the locking sleeve is rotated between the first rotational position and the second rotational position.

10. The coupling of claim 9 wherein the valve housing has a first side and second side symmetrical with the first side, each side having a hole and a piston received therein.

* * * * *